US011974899B2

(12) United States Patent
Bilodeau

(10) Patent No.: US 11,974,899 B2
(45) Date of Patent: May 7, 2024

(54) SUBPERIOSTEAL DENTAL IMPLANT DEVICE, SUBPERIOSTEAL SECUREMENT KIT AND METHOD FOR SECURING A SUBPERIOSTEAL DENTAL IMPLANT DEVICE TO AN EXPOSED JAWBONE

(71) Applicant: PANTHERA DENTAL INC., Quebec (CA)

(72) Inventor: Jean-Pierre Bilodeau, Beaumont (CA)

(73) Assignee: Panthera Dental Inc., Quebec (CA)

( * ) Notice: Subject to any disclaimer, the term of this patent is extended or adjusted under 35 U.S.C. 154(b) by 52 days.

(21) Appl. No.: 17/049,755

(22) PCT Filed: Apr. 18, 2019

(86) PCT No.: PCT/CA2019/050491
§ 371 (c)(1),
(2) Date: Oct. 22, 2020

(87) PCT Pub. No.: WO2019/204908
PCT Pub. Date: Oct. 31, 2019

(65) Prior Publication Data
US 2021/0244514 A1 Aug. 12, 2021

Related U.S. Application Data

(60) Provisional application No. 62/661,366, filed on Apr. 23, 2018.

(51) Int. Cl.
*A61C 8/00* (2006.01)
*A61C 1/08* (2006.01)

(52) U.S. Cl.
CPC ............ *A61C 8/0089* (2013.01); *A61C 1/084* (2013.01); *A61C 8/0027* (2013.01); *A61C 8/0031* (2013.01)

(58) Field of Classification Search
CPC ..... A61C 8/0089; A61C 8/009; A61C 8/0092; A61C 8/0093; A61C 8/0027;
(Continued)

(56) References Cited

U.S. PATENT DOCUMENTS 5,989,025 A 11/1999 Conley
5,989,028 A * 11/1999 Niznick ................. A61C 8/005
433/173
(Continued)

FOREIGN PATENT DOCUMENTS

DE 202016100245 U1 * 3/2017 ............. A61B 17/17
WO 2007129955 A1 11/2007
(Continued)

OTHER PUBLICATIONS

Extended European Search Report for European Application No. 19793610.7, mailed Jan. 11, 2022, 9 pages.
(Continued)

*Primary Examiner* — Jan Christopher L Merene
*Assistant Examiner* — Luis Ruiz Martin
(74) *Attorney, Agent, or Firm* — Brooks Kushman P.C.

(57) ABSTRACT

A subperiosteal securement kit is provided including a subperiosteal dental implant device and a drilling guide attachable thereto. The subperiosteal dental implant device has a frame engageable with the jawbone of a patient and a Fixation bore sized and shaped to receive therein a bone screw. The drilling guide has an elongated guiding channel sized shaped to receive a drill bit therein and is removably attachable to the frame of the subperiosteal dental implant device, with the guiding channel being in communication with the fixation bore when the drilling guide is attached to the frame of the subperiosteal dental implant device. A method subperiosteal dental implant device is provided to be (Continued)

secured to a jawbone of a patient and being engageable with a drilling guide having a threaded section.

13 Claims, 8 Drawing Sheets

(58) Field of Classification Search
CPC ....... A61C 8/0031; A61C 1/082; A61C 1/084; A61C 1/085; A61B 17/8052; A61B 17/8057; A61B 17/1728; A61B 17/80; Y10T 403/368
USPC .................................. 606/96, 104, 284, 291
See application file for complete search history.

(56) References Cited

U.S. PATENT DOCUMENTS

| | | | |
|---|---|---|---|
| 8,439,955 B2* | 5/2013 | Sixto, Jr. ................ | A61B 17/17 606/283 |
| 2005/0085825 A1* | 4/2005 | Castaneda .......... | A61B 17/1725 606/102 |
| 2014/0272793 A1 | 9/2014 | Grant et al. | |
| 2018/0104028 A1 | 4/2018 | Robichaud | |

FOREIGN PATENT DOCUMENTS

| WO | WO-2007129955 A1 * | 11/2007 | ............. A61C 1/084 |
|---|---|---|---|
| WO | 2016201580 A1 | 12/2016 | |
| WO | WO-2016198935 A1 * | 12/2016 | ........... A61C 8/0031 |
| WO | WO-2016201580 A1 * | 12/2016 | ............. A61B 34/10 |

OTHER PUBLICATIONS

International Search Report and Written Opinion of PCT/CA2019/050491 mailed Jun. 20, 2019, 10 pages.

* cited by examiner

SUBPERIOSTEAL DENTAL IMPLANT DEVICE, SUBPERIOSTEAL SECUREMENT KIT AND METHOD FOR SECURING A SUBPERIOSTEAL DENTAL IMPLANT DEVICE TO AN EXPOSED JAWBONE

CROSS-REFERENCE TO RELATED APPLICATION

This application is the U.S. national phase of International Application No. PCT/CA2019/050491 filed on Apr. 18, 2019 which claims the benefit of US provisional patent application 62/661,366 filed on Apr. 23, 2018, the disclosures of which are incorporated in their entirety by reference herein.

TECHNICAL FIELD OF THE INVENTION

The present invention relates to the field of dental implant devices. More particularly, the present invention relates to a subperiosteal dental implant device specifically designed to receive a drilling guide, to a subperiosteal securement kit for securing the subperiosteal dental implant device to a jawbone of a patient and to a method for securement of the subperiosteal dental implant device to an exposed jawbone of a patient.

BACKGROUND

Subperiosteal dental implant devices are implants being positioned below a patient's gum, but on or above the jawbone, rather than inside the bone. For example, and without being limitative, this particular type of implant is commonly used for patients having a shallow jawbone and who cannot or do not want to undergo a procedure to rebuild the jawbone. Subperiosteal dental implant devices typically include a metal framework onto which one or more replacement teeth are directly or indirectly mounted. In some implementations, the subperiosteal dental implant devices can include one or more implant head, mounted to the framework, for fixation of a tooth. Hence, the metal framework is positioned over the jawbone and secured thereon, underneath the gum tissue and engaged with the jawbone of the patient.

In order to secure the metal framework to the patient's jawbone, it is common for physicians to insert the bone-suitable screws in a corresponding fixation bore defined in the metal framework and directly engage the bone-suitable screws into the jawbone, using a screwing tool such as a screwdriver. Such a method however tends to suffer from several drawbacks. Amongst others, it often leads to the bone-suitable screws not being exactly positioned at the optimal position and/or angle, for example and without being limitative, as a result of undesirable slipping or tilting of the screws (or the screwing element) during the screwing operations.

In view of the above, there is a need for an improved subperiosteal dental implant device, a subperiosteal securement kit and/or a method of securing a subperiosteal dental implant device to an exposed jawbone, which would be able to overcome or at least minimize some of the above-discussed prior art concerns.

SUMMARY

In accordance with a first general aspect, there is provided a subperiosteal securement kit. The subperiosteal securement kit comprises a subperiosteal dental implant device to be secured to a jawbone of a patient and a drilling guide attachable to the subperiosteal dental implant device. The subperiosteal dental implant device comprises a frame designed to engage an external surface of the jawbone of the patient and a fixation bore defined in a section of the frame and extending therethrough. The fixation bore is sized and shaped to receive therein a bone screw. The drilling guide comprises a drilling guide body with an elongated guiding channel extending therethrough and being sized and shaped to receive a drill bit therein. The drilling guide is removably attachable to the frame of the subperiosteal dental implant device, with the guiding channel being in communication with the fixation bore when the drilling guide is attached to the frame of the subperiosteal dental implant device.

In an embodiment, the drilling guide comprises a threaded section and the fixation bore is defined by a void section delimited by a peripheral wall surface facing inwardly towards the void section. The subperiosteal dental implant device further comprises internal threads defined in at least a portion of the peripheral wall surface delimiting the void section of the fixation bore. The peripheral wall surface and the corresponding internal threads are adapted to thread with threads of the threaded section of the drilling guide.

In an embodiment, the drilling guide is used to drill a pilot hole in the jawbone of the patient. The subperiosteal securement kit further comprises a bone screw insertable in the fixation bore of the subperiosteal dental implant device and securable in the pilot hole defined in the jawbone of the patient.

In an embodiment, the guiding channel comprises an inlet, with the guiding channel including a countersink at the inlet thereof.

In an embodiment, the threaded section surrounds a portion of the guiding channel defined in the drilling guide body.

In an embodiment, the drilling guide body comprises a subperiosteal engaging portion and the threaded section of the drilling guide extends along the subperiosteal engaging portion of the drilling guide body.

In an embodiment, the guiding channel comprises an outlet, with the outlet of the guiding channel being at a lower/free end of the threaded section of the drilling guide body.

In an embodiment, the drilling guide body includes a subperiosteal engagement shoulder having a shoulder profile and being engageable with a section of the frame of the subperiosteal dental implant device having a frame profile when the drilling guide is attached to the subperiosteal dental implant device. The shoulder profile of the subperiosteal engagement shoulder is complementary with the frame profile of a corresponding section of the frame.

In accordance with another general aspect, there is also provided a subperiosteal dental implant device to be secured to a jawbone of a patient and being engageable with a drilling guide having a threaded section. The subperiosteal dental implant device comprises a frame designed to engage an external surface of the jawbone of the patient and a fixation bore defined in a section of the frame and extending therethrough. The fixation bore is sized and shaped to receive therein a bone screw and is defined by a void section delimited by a peripheral wall surface facing inwardly towards the void section. The subperiosteal dental implant device further comprises internal threads defined in at least a portion of the peripheral wall surface delimiting the void section of the fixation bore. The peripheral wall surface and the corresponding internal threads are adapted to thread with threads of the threaded section of the drilling guide.

In an embodiment, the frame is patient-specific. The shape of the frame is designed to at least partially conform to the external surface of the jawbone, with the frame being superposable to the jawbone in a single position.

In accordance with another general aspect, there is further provided a method for securing a subperiosteal dental implant device having a fixation bore defined in a frame thereof to an exposed jawbone of a patient. The method comprises:
- attaching a drilling guide to the subperiosteal dental implant device, the drilling guide including a guiding channel in communication with the fixation bore defined in the frame of the subperiosteal dental implant device when the drilling guide is attached to the subperiosteal dental implant device;
- superposing the subperiosteal dental implant device to the jawbone and positioning the subperiosteal dental implant device at a predetermined position thereabout;
- inserting a drill bit into the guiding channel of the drilling guide and moving the drill bit along the guiding channel to drill a pilot hole in the jawbone of the patient;
- detaching the drilling guide from the subperiosteal dental implant device; and
- inserting a bone screw in the fixation bore and fastening the bone screw in the pilot hole in the jawbone to secure the subperiosteal dental implant device to the jawbone of the patient.

In an embodiment, attaching the drilling guide to the subperiosteal dental implant device comprises threading a threaded section of the drilling guide into internal threads defined in a peripheral wall surface delimiting the fixation bore.

In an embodiment, detaching the drilling guide from the subperiosteal dental implant device comprises unthreading the threaded section of the drilling guide from the internal threads defined in the peripheral wall surface.

According to a general aspect, there is provided a subperiosteal securement kit comprising: a subperiosteal dental implant device securable to a jawbone of a patient, the subperiosteal dental implant device comprising: a frame superposable to an external surface of the jawbone of the patient, the frame having a fixation bore extending through a section thereof and being sized and shaped to receive therein a bone screw; and a drilling guide attachable to the subperiosteal dental implant device, the drilling guide comprising a drilling guide body with an elongated guiding channel extending therethrough and being sized and shaped to receive a drill bit therein, the drilling guide being removably attachable to the frame of the subperiosteal dental implant device, with the guiding channel being in communication with the fixation bore when the drilling guide is attached to the frame of the subperiosteal dental implant device.

In an embodiment, the drilling guide comprises a subperiosteal engaging portion ending with a subperiosteal engaging end and a drilling tool insertion end, opposed to the subperiosteal engaging end, the subperiosteal engaging portion being at least partially insertable in the fixation bore. The drilling guide can comprise a threaded section adjacent to the subperiosteal engaging end, and wherein the fixation bore can be defined by a void section delimited by a peripheral wall surface facing inwardly towards the void section. The subperiosteal dental implant device can further comprise internal threads defined along at least a portion of the peripheral wall surface delimiting the void section of the fixation bore, the peripheral wall surface and the corresponding internal threads being engageable with threads of the threaded section of the drilling guide.

In an embodiment, the guiding channel of the drilling guide is configured to receive the drill bit to drill a pilot hole in the jawbone of the patient, the subperiosteal securement kit further comprising a bone screw insertable in the fixation bore of the subperiosteal dental implant device and securable in the pilot hole defined in the jawbone of the patient.

The guiding channel can comprise an inlet port and a countersink adjacent to the inlet port and surrounding same. The threaded section can surround a section of the guiding channel extending at least partially along a length of the subperiosteal engaging portion. The threaded section of the drilling guide can extend along an entire length of the subperiosteal engaging portion of the drilling guide body.

In an embodiment, the guiding channel comprises an outlet port located at the subperiosteal engaging end, the outlet port being concentric with the fixation bore when the drilling guide is attached to the frame of the subperiosteal dental implant device.

In an embodiment, the frame has a bone-facing surface and an implant head receiving surface, opposed to the bone-facing surface with the bone-facing surface contacting the external surface of the jawbone when the frame is superposed thereto and the fixation bore extending between the bone-facing surface and the implant head receiving surface. The drilling guide body can include a subperiosteal engagement shoulder having a shoulder profile and abuttable against the implant head receiving surface of the frame along a contact section, the implant head receiving surface having a frame profile, the shoulder profile of the subperiosteal engagement shoulder being complementary in shape with the frame profile along the contact section. The drilling guide body can comprise a main section with a drilling tool insertion end and a subperiosteal engaging portion ending with a subperiosteal engaging end, opposed to the drilling tool insertion end, the subperiosteal engaging portion being at least partially insertable in the fixation bore and having a diameter smaller than a diameter of the main section with the subperiosteal engagement shoulder being located at a junction of the main section and the subperiosteal engaging portion.

According to another general aspect, there is provided a subperiosteal dental implant device securable to a jawbone of a patient and being detachably engageable with a drilling guide having a subperiosteal engaging portion with a threaded section. The subperiosteal dental implant device comprises: a frame superposable to an external surface of the jawbone of the patient and having an inner peripheral wall surface in a section of the frame delimiting a fixation bore, the fixation bore extending through the section of the frame and being sized and shaped to receive therein a bone screw, the inner peripheral wall surface including internal threads extending along a section of the inner peripheral wall surface with the internal threads being engageable with the threaded section of the drilling guide to attach the drilling guide to the frame.

In an embodiment, the frame has a bone-facing surface and an implant head receiving surface, opposed to the bone-facing surface with the bone-facing surface contacting the external surface of the jawbone when the frame is superposed thereto and the fixation bore extends between the bone-facing surface and the implant head receiving surface, the bone-facing surface being patient-specific and having a shape at least partially conforming to the external surface of the jawbone, with the frame being superposable to the jawbone in a single position.

According to a further general aspect, there is provided a drilling guide for a subperiosteal dental implant device having a frame with a fixation bore extending therethrough. The drilling guide comprises: a drilling guide attachable to the subperiosteal dental implant device, the drilling guide comprising a drilling guide body with an elongated guiding channel extending therethrough and being sized and shaped to receive a drill bit therein, the drilling guide being removably attachable to the frame of the subperiosteal dental implant device, with the guiding channel being in communication with the fixation bore when the drilling guide is attached to the frame of the subperiosteal dental implant device.

In an embodiment, the drilling guide comprises a subperiosteal engaging portion ending with a subperiosteal engaging end and a drilling tool insertion end, opposed to the subperiosteal engaging end, the subperiosteal engaging portion being at least partially insertable in the fixation bore. The drilling guide can comprise a threaded section adjacent to the subperiosteal engaging end and being engageable with internal threads defined along a section of a peripheral wall surface delimitating the fixation bore to attach the drilling guide to the frame of the subperiosteal dental implant device.

In an embodiment, the guiding channel comprises an inlet port and a countersink, adjacent to the inlet port and surrounding same.

The threaded section can surround a section of the guiding channel extending at least partially along a length of the subperiosteal engaging portion. The threaded section of the drilling guide can extend along an entire length of the subperiosteal engaging portion of the drilling guide body. The guiding channel can comprise an outlet port located at the subperiosteal engaging end, the outlet port being concentric with the fixation bore when the drilling guide is attached to the frame of the subperiosteal dental implant device.

In an embodiment, the frame is superposable to an external surface of the jawbone of the patient and has a bone-facing surface and an implant head receiving surface, opposed to the bone-facing surface with the bone-facing surface contacting the external surface of the jawbone when the frame is superposed thereto and the fixation bore extending between the bone-facing surface and the implant head receiving surface; and wherein the drilling guide body includes a subperiosteal engagement shoulder having a shoulder profile and abuttable against the implant head receiving surface of the frame along a contact section, the implant head receiving surface having a frame profile, the shoulder profile of the subperiosteal engagement shoulder being complementary in shape with the frame profile along the contact section. The drilling guide body can comprise a main section with a drilling tool insertion end and a subperiosteal engaging portion ending with a subperiosteal engaging end, opposed to the drilling tool insertion end, the subperiosteal engaging portion being at least partially insertable in the fixation bore and having a diameter smaller than a diameter of the main section with the subperiosteal engagement shoulder being located at a junction of the main section and the subperiosteal engaging portion.

According to still another general aspect, there is provided a method for securing a subperiosteal dental implant device having a frame superposable to an external and exposed surface of a patient's jawbone and having a fixation bore therein. The method comprises: attaching a drilling guide to the frame of the subperiosteal dental implant device, the drilling guide including a guiding channel aligned and in communication with the fixation bore when the drilling guide is attached to the subperiosteal dental implant device; superposing the subperiosteal dental implant device to the external and exposed surface of the jawbone, wherein superposing the subperiosteal dental implant device to the external and exposed surface of the jawbone is performed either before or after attaching the drilling guide to the frame; inserting a drill bit into the guiding channel of the drilling guide and moving the drill bit along the guiding channel to drill a pilot hole in the jawbone of the patient; removing the drill bit from the guiding channel; detaching the drilling guide from the subperiosteal dental implant device; and screwing a bone screw in the fixation bore to insert the bone screw in the pilot hole and secure the subperiosteal dental implant device to the jawbone of the patient.

In an embodiment, attaching the drilling guide to the subperiosteal dental implant device comprises screwing a threaded section of the drilling guide into internal threads defined in a peripheral wall surface delimitating the fixation bore. In an embodiment, detaching the drilling guide from the subperiosteal dental implant device comprises unscrewing the threaded section of the drilling guide from the internal threads defined in the peripheral wall surface.

In an embodiment, the subperiosteal dental implant device is superposed to the external and exposed surface of the jawbone in a predetermined position.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 2b is a close-up view of a section of the partial subperiosteal dental implant device and screwing element of FIG. 2a.

FIG. 5a is a front elevation view of the drilling guide shown engaged with the partial subperiosteal dental implant device in FIG. 3a.

FIG. 5b is a cross-sectional view of the drilling guide of FIG. 5a, taken along lines 5b-5b in FIG. 5a.

DETAILED DESCRIPTION

Figure 1:
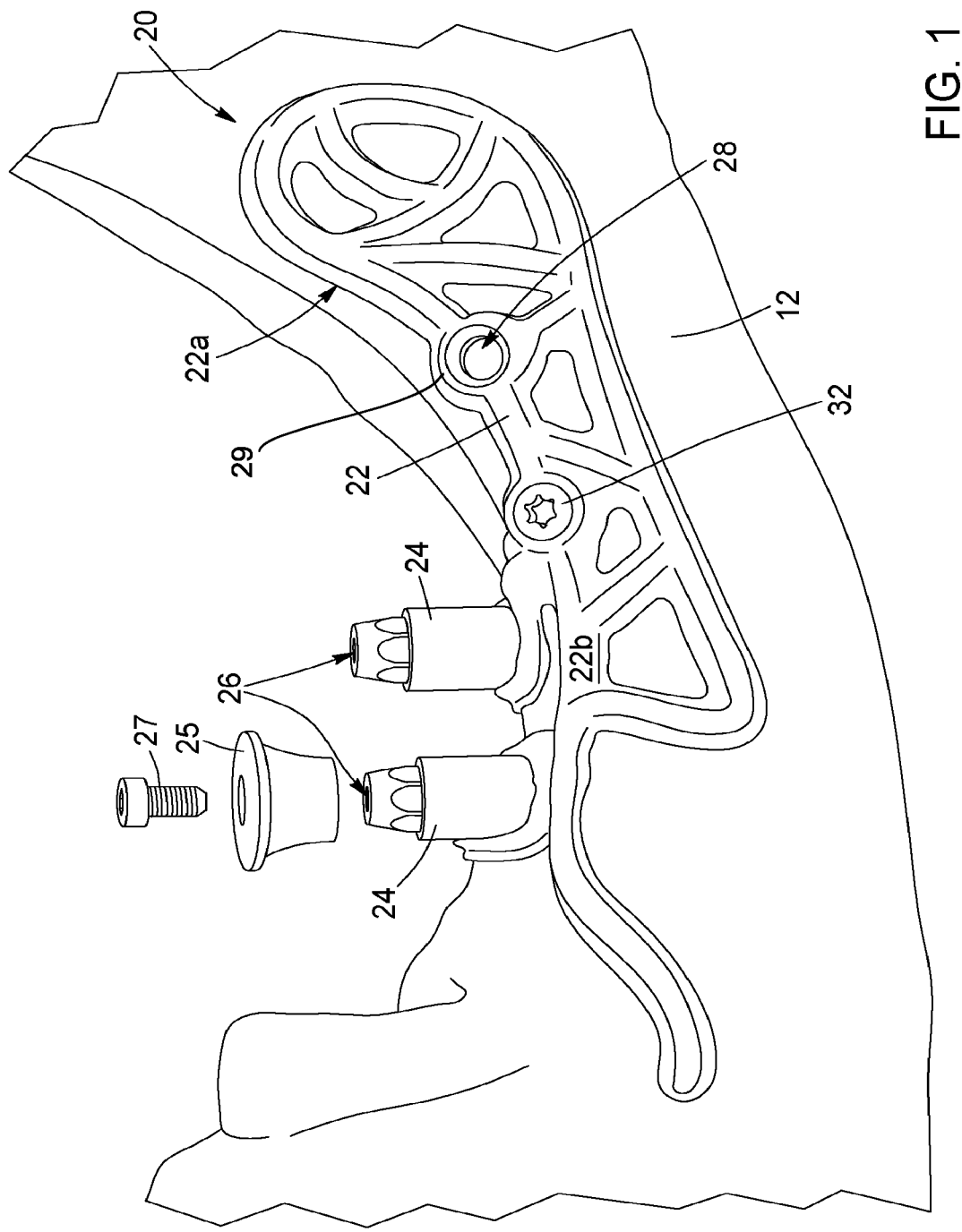
FIG. 1 is an isometric view of a partial subperiosteal dental implant device shown mounted to a jawbone of a patient, in accordance with an embodiment.
Figure 2A:
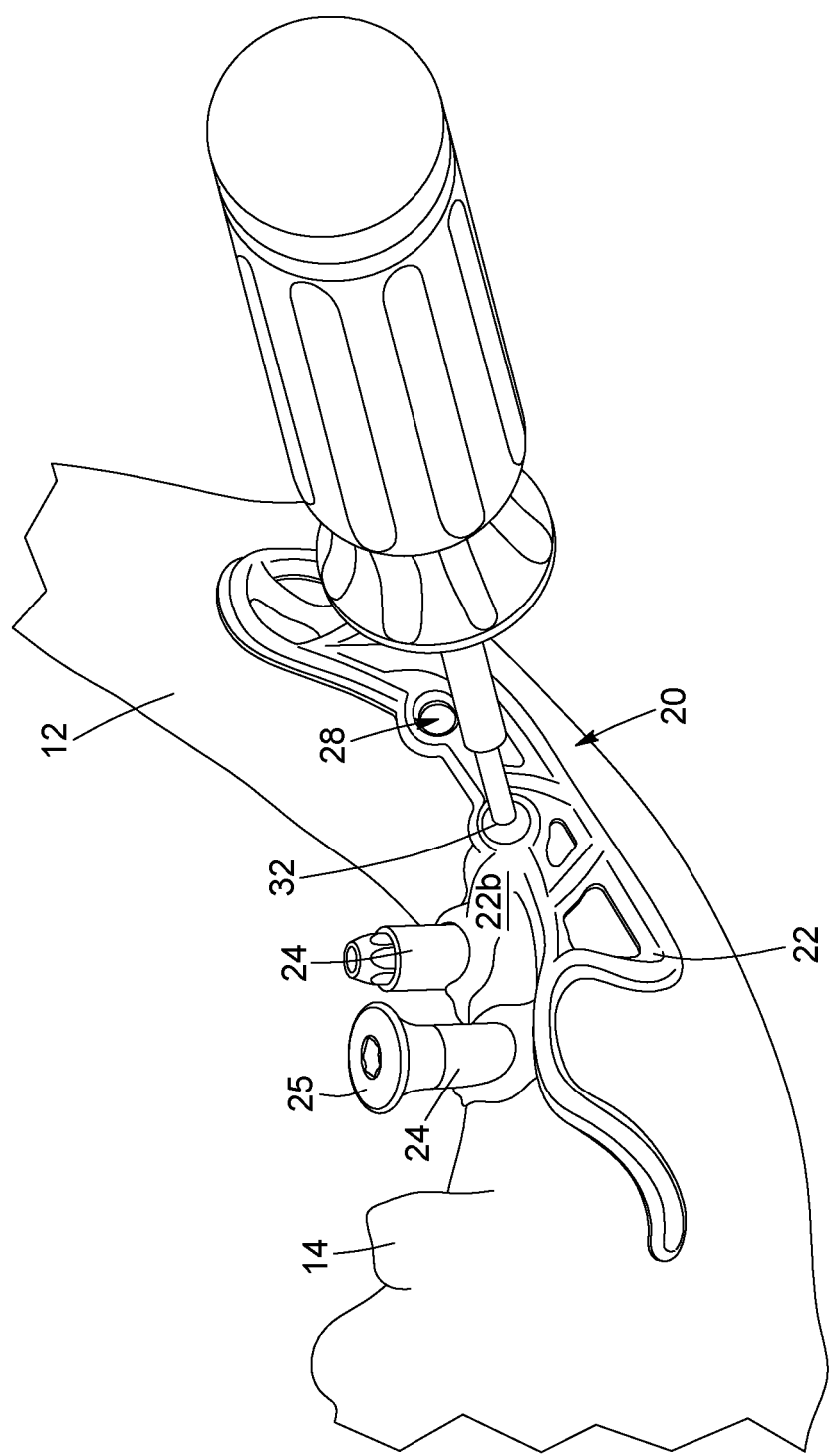
FIG. 2a is an isometric view of the partial subperiosteal dental implant device of FIG. 1, shown mounted to the jawbone of the patient, with a screwing element engaged with a bone screw fastened to the jawbone of the patient.
Figure 2B:
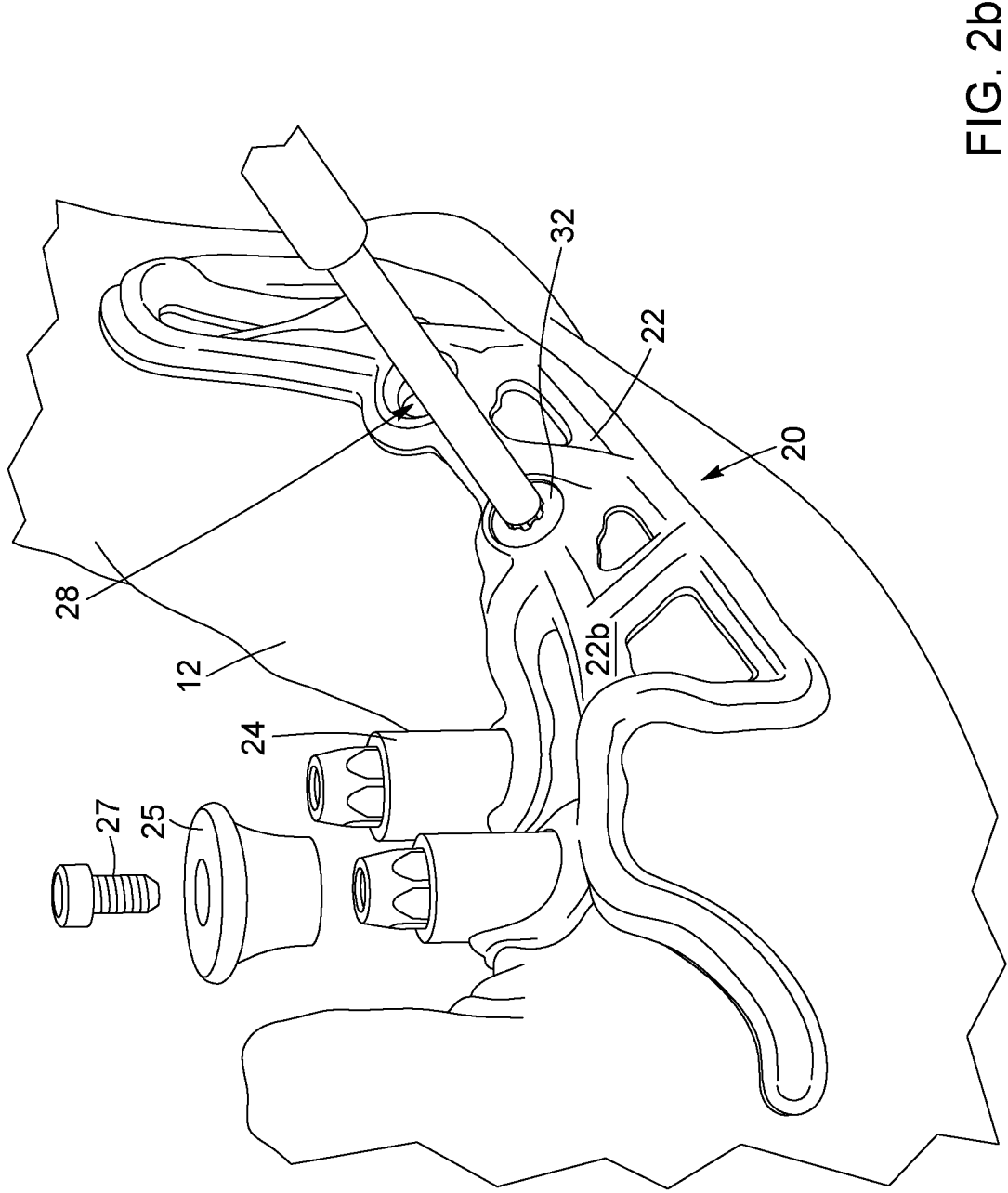

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the subperiosteal dental implant device and subperiosteal securement kit and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the subperiosteal dental implant device and subperiosteal securement kit, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting. Moreover, although the associated method for securement of a subperiosteal dental implant device to an exposed jawbone includes steps as explained and illustrated herein, not all of these steps are essential and thus should not be taken in their restrictive sense. It will be appreciated that the steps of the method of installation of a subperiosteal dental implant device described herein may be performed in the described order, or in any suitable order.

Referring generally to FIGS. 1 to 4, in accordance with one embodiment, there is shown a subperiosteal dental implant device 20 superposable and securable to a jawbone 12 of a patient. As will be described in more details below, the subperiosteal dental implant device 20 is adapted to be coupled temporary to a drilling guide 40, in order to facilitate the positioning and orientation of a drill bit 60 of a drill 62, during a procedure where a pre-drilled (or pilot) hole is drilled in the jawbone 12 of the patient, for subsequently securing the subperiosteal dental implant device 20 to the jawbone 12 of the patient using bone screw(s) 32 and ensuring the proper position and orientation of the bone screw(s) 32 in the jawbone 12. As will be described in more details below, the subperiosteal securement kit includes the combination of the subperiosteal dental implant device 20 and the drilling guide 40 allowing the drill bit 60 to be positioned according to a predetermined unique position and orientation and to be maintained in such predetermined position and orientation during the entire drilling procedure of a pilot hole.

In the embodiment shown, the subperiosteal dental implant device 20 is a partial subperiosteal dental implant device designed to engage only a section of the patient's jawbone 12. Such a device is usually used when the patient's mouth includes at least one existing tooth 14. One skilled in the art will however understand that, in an alternative embodiment (not shown), the subperiosteal dental implant device 20 could be a total subperiosteal dental implant device designed to engage an entire (or substantially entire) patient's jawbone. In this description, the term "subperiosteal dental implant device" intends to include partial subperiosteal dental implant devices.

Referring to FIG. 1, the subperiosteal dental implant device 20 includes a frame 22 (also referred herein as "framework"). The frame 22 is designed to be engaged with and, more particularly, sit on an external surface of the jawbone 12 of the patient. In an embodiment, the framework 22 can be made of metal, such as titanium or titanium alloy, but one skilled in the art will understand that, in alternative embodiments other materials could be used.

In the embodiment shown, the subperiosteal dental implant device 20 is patient-specific, such that the shape of the frame 22 is designed to at least partially conform to the external shape of the jawbone 12 and, thus, the frame 22 can be superposed to the jawbone in a single position. In other words, in the embodiment shown, the frame 22 includes a bone-facing surface 22a which at least partially substantially conforms to an external shape of the jawbone 12 of the patient when the subperiosteal dental implant device 20 is superposed to the jawbone 12, such that the subperiosteal dental implant device 20 can be mounted to the jawbone 12 of the patient in a single predetermined position (i.e. the bone-facing surface 22a can be patient's specific). The frame 22 also includes an implant head receiving surface 22b, opposed to the bone-facing surface 22a. For example, and without being limitative, an assembly (not shown) including the subperiosteal dental implant device 20 and a positioning jig (not shown) engageable with at least one existing tooth 14 can be used to ensure that the subperiosteal dental implant device 20 is positioned in the predetermined single position. For instance, an embodiment of a positioning jig is described and shown in U.S. Pat. No. 10,149,745, which is incorporated herewith by reference. One skilled in the art will understand that, in an alternative embodiment (not shown), a subperiosteal dental implant device 20 having a generic shape (i.e. a non patient-specific shape) could also be used.

It will be understood that the subperiosteal dental implant device 20 can be used for different types of restorations, such as maxillary and/or mandibular dental restorations.

In the embodiment shown, the subperiosteal dental implant device 20 includes one or more implant heads 24 extending from the frame 22, or at least a portion thereof (only two are shown in FIG. 1 but it is appreciated that the subperiosteal dental implant device 20 can include only one or more than two implant heads 24). The implant head(s) 24, or at least a portion thereof, can be integral (or single piece) with the frame 22, i.e. they can be manufactured simultaneously with the frame 22 as a single piece, or can be removably mountable to/engageable with the frame 22. Each implant head 24 is configured to engage with one replacement tooth (not shown) or a plurality of connected replacement teeth. In the particular embodiment shown in FIG. 1, the frame 22 has two implant heads 24, each having an internally threaded socket 26 adapted to receive an intermediary threaded connector (not shown) to provide an engagement between the replacement tooth (not shown) and the implant head 24, or a threaded portion of a replacement tooth (not shown) to directly mount the replacement tooth (not shown) to the implant head 24. In an alternative embodiment (not shown), the implant head(s) 24 could be free of the above described internally threaded socket 26, with each replacement tooth (not shown) being connected to the corresponding implant head 24 differently than by threading into a threaded socket 26 (e.g. the replacement tooth (not shown) could be connected to the corresponding implant head permanently). One skilled in the art will also understand that, in an alternative embodiment (not shown), the subperiosteal dental implant device 20 could be free of implant head 24, with the replacement tooth (not shown) being directly securable to the frame 22. It is appreciated that the shape of the implant head 24 can vary from the embodiment shown.

Healing caps 25 can be mounted to and attached to the implant head 24 with a mechanical fastener, such as a screw 27, until the replacement tooth is engaged therewith and secured thereto.

Referring to FIGS. 1 to 5d, in order to allow the securement of the frame 22 of the subperiosteal dental implant device 20 to the jawbone 12 of the patient, the subperiosteal dental implant device 20 further includes at least one fixation bore 28 defined in a section of the frame 22 and extending therethrough. More particularly, each one of the fixation bore(s) 28 extends through the frame 22, between the bone-facing surface 22a and the implant head receiving surface 22b, and is open (accessible) at each one of the bone-facing surface 22a and the implant head receiving surface 22b. Each fixation bore 28 is defined by a void section delimited by an inner peripheral wall surface 31 facing inwardly towards the void section. Each fixation bore 28 is sized and shaped to receive therein a bone screw 32 engageable with the jawbone 12 of the patient for securing the subperiosteal dental implant device 20 to the jawbone 12. One skilled in the art will understand that, in an embodiment, a single fixation bore 28 can be provided and, in alternative embodiments, multiple fixation bores 28 could be provided along the frame 22, in order to provide proper securement of the frame 22 of the subperiosteal dental implant device 20 to the jawbone 12 of the patient.

For each fixation bore 28, the frame 22 also includes internal threads 30 defined along at least a section of the peripheral wall surface 31 delimiting the bore 28. The peripheral wall surface 31 and the corresponding internal threads 30 are adapted to receive a threaded section 42 of the drilling guide 40 therein, with the threaded section 42 of the drilling guide 40 threading into the internal threads 30 defined in the peripheral wall surface 31 defining the fixation bore 28. In other words, the fixation bore 28 thereby defines an internally threaded socket for receiving the threaded section 42 of the drilling guide 40. As will be described in more details below, such a combination allows the drilling guide 40 to be secured to the subperiosteal dental implant device 20, for each fixation bore 28, simply by threading the threaded section 42 of the drilling guide 40 in the internal threads 30 defined in the peripheral wall surface 31 delimiting a corresponding fixation bore 28. The temporary attachment of the drilling guide 40 to the subperiosteal dental implant device 20 consequently assists in performing a precise drilling of a pre-drilled (pilot) hole in the jawbone 12 of the patient, before the bone screws 32 can be inserted in the corresponding fixation bore 28 and fastened into the jawbone 12.

The drilling guide 40 includes a drilling guide body 41, made of rigid material such as, for example and without being limitative, metal. One skilled in the art will understand that, in alternative embodiments, the drilling guide body 41 could be made of any material offering sufficient rigidity and hardness. It will be understood that, in an embodiment, the same drilling guide 40 can be used for each fixation bore 28 (i.e. the same drilling guide 40 can be used for threading in the internal threads 30 defined in the peripheral wall surface 31 of each fixation bore 28). In an alternative embodiment, multiple drilling guides 40 can be provided, each drilling guide 40 being adapted to be threaded in the internal threads 30 defined in the peripheral wall surface 31 of a corresponding fixation bore 28.

The drilling guide 40 also includes an elongated guiding channel 44 defined in the drilling guide body 41 and extending therethrough. The guiding channel 44 is sized and shaped to receive a drill bit 60 therein, in a tight fit, and to guide the drill bit 60 towards the jawbone 12 of the patient according to a predetermined position and orientation, when the drilling guide 40 is engaged with the subperiosteal dental implant device 20.

The guiding channel 44 has an inlet port 44a (or inlet) at a first end thereof and an outlet port 44b (or outlet) at a second end, opposed to the first end thereof, i.e. the end engageable with the frame 22. In the embodiment shown, the inlet port 44a of the guiding channel 44 is located at a drilling tool insertion end 41a of the drilling guide body 41 and the outlet port 44b of the guiding channel 44 is located at a subperiosteal engaging end 41b (or lower/free end) of the drilling guide body 41. In the embodiment, shown, the guiding channel 44 includes a countersink 46, at the inlet port 44a thereof (i.e. the guiding channel 44 has a chamfered configuration along a section following the inlet port 44a) (see FIGS. 4, 5b and 5c). One skilled in the art will understand that the countersink section 46 of the guiding channel 44 can be defined by a chamfered angle different than the embodiment shown. In an embodiment, the countersink 46 of the guiding channel 44 facilitates the insertion of the drill bit 60 into the guiding channel 44, for performing the pre-drilling procedure and can engage a head of the drill 62 when the drill bit 60 is sufficiently driven into the guiding channel 44.

As mentioned above, the drilling guide 40 also includes a threaded section 42 including external threads 43 engageable with the internal threads 30 defined in the peripheral wall surface 31 delimiting each bore 28. In more details, in the embodiment shown, the threaded section 42 is a section of the drilling guide body 41, which is located along a subperiosteal engaging portion 39 thereof and which includes the outlet port 44b of the guiding channel 44 defined at the free and subperiosteal engaging end 41b of the drilling guide body 41. In other words, in the embodiment shown, the threaded section 42 is the section of the drilling guide body 41 which surrounds the guiding channel 44 along the subperiosteal engaging portion 39 thereof, with the outlet port 44b of the guiding channel 44 being at a free end of the threaded section 42 of the drilling guide body 41. One skilled in the art will understand that, in an alternative embodiment (not shown), the threads 43 of the threaded section 42 may not extend until the subperiosteal engaging end 41b (or lower/free end) of the drilling guide body 41, thereby leaving an unthreaded section below the threads 43. Furthermore, in an embodiment, an outer surface of the subperiosteal engaging portion 39 may not include threads along an entire length thereof.

As mentioned above, the drilling guide 40 can be attached to the subperiosteal dental implant device 20 and detached from the subperiosteal dental implant device 20 respectively by threading and unthreading the threaded section 42 of the drilling guide 40 from the internal threads 30 defined in the peripheral wall surface 31 delimiting a corresponding fixation bore 28 (i.e. by threading and unthreading the threaded section 42 of the drilling guide 40 in the threaded socket defined by the corresponding fixation bore 28). When the drilling guide 40 is attached to the subperiosteal dental implant device 20, the guiding channel 44 of the drilling guide 40 is aligned with, or is concentric with, and, in some implementations (not shown), in register with the corresponding fixation bore 28 (i.e. perimeters delimiting the corresponding void sections are aligned and in communication with one another, with the guiding channel 44 of the drilling guide 40 extending into the corresponding fixation bore 28), such that a drill bit 60 translating through and rotating into the guiding channel 44 of the drilling guide 40 can translate through and rotating into the corresponding fixation bore 28 and drill a pre-hole (or pilot hole) in the jawbone 12, which can subsequently be used to insert a portion of a bone screw 32 into the corresponding fixation bore 28 (once the drilling guide 40 has been detached from the frame 22).

Figure 4:
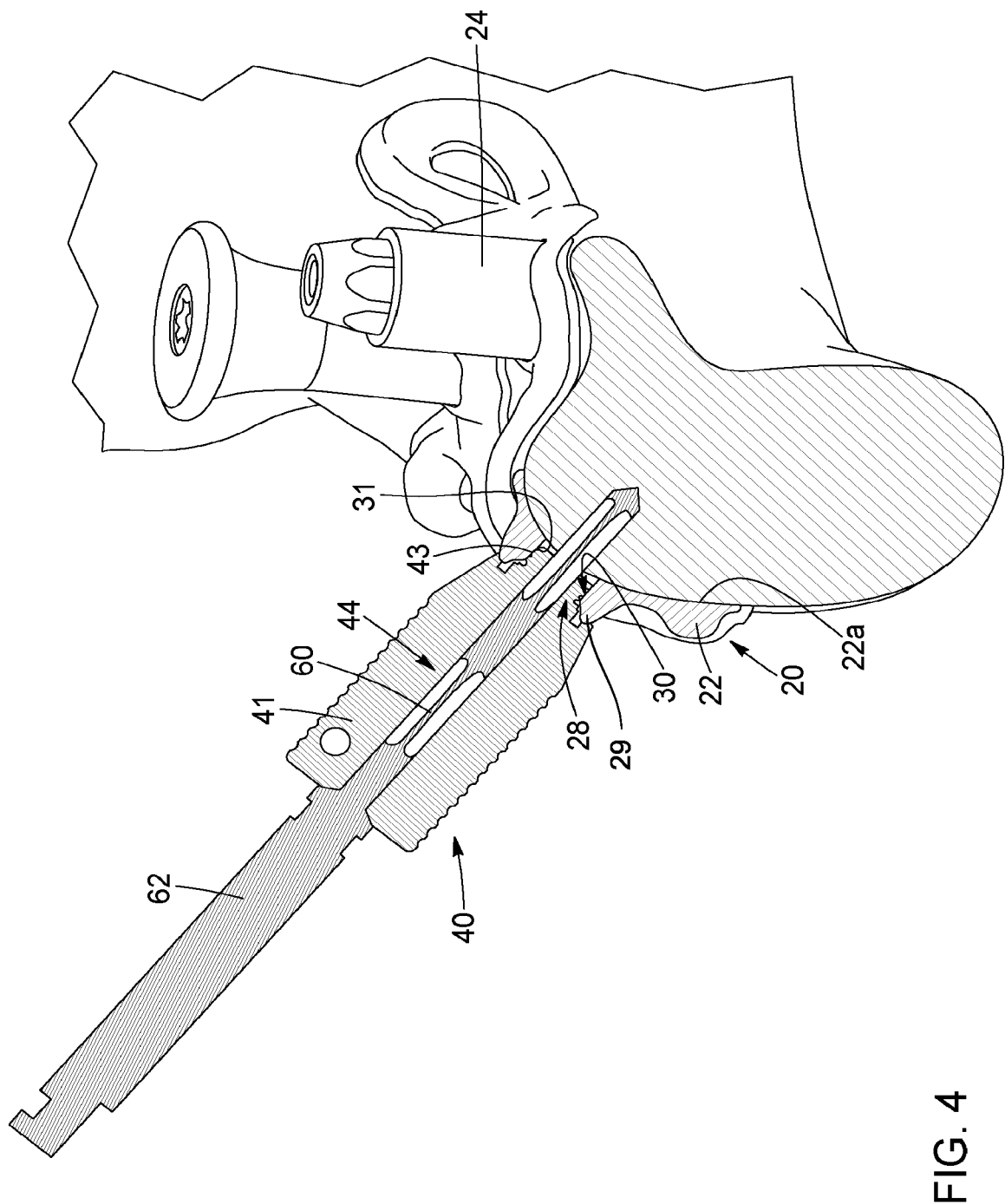
FIG. 4 is a cross-sectional view of the partial subperiosteal dental implant device of FIG. 3a, with the drilling guide engaged therewith, and a drill bit inserted in the drilling guide for drilling a pilot hole in the jawbone of the patient.

In the implementation shown, the fixation bore 28 includes only one section having substantially a single diameter along its entire length. As shown in FIG. 4, when the drilling guide 40 is attached to the frame 22, the subperiosteal engaging end 41b of the drilling guide 40 is slightly spaced-apart from the jawbone 12 of the patient. In another embodiment, the subperiosteal engaging end 41b of the drilling guide 40 could abut against the jawbone 12 of the patient when attached to the frame 22.

It is appreciated that, in an alternative embodiment, the fixation bore could be divided into two sections along its length, i.e. between the bone-facing surface 22a and the implant head receiving surface 22b, characterized by different diameters. In a first section extending inwardly from the implant head receiving surface 22b, a diameter of the fixation bore 28 is wider than a diameter of the fixation bore 28 in a second section extending inwardly from the bone-facing surface 22a. The two sections of the fixation bore 28 are in communication and concentric with an abutting shoulder 29 being defined at their junction, i.e. the abutting shoulder 29 extends outwardly and peripherally from the second section. The first section is designed to receive the subperiosteal engaging portion 39 of the drilling guide 40 with the subperiosteal engaging end 41b abutting against the abutting shoulder 29 when the drilling guide 40 is engaged with the frame. The peripheral wall surface 31 delimitating the first section of the fixation bore 28 can include internal threads 30 along a portion thereof to attach the drilling guide 40 to the frame and, more particularly, to engage with the threaded section 42 of the subperiosteal engaging portion 39.

The diameter of the second section of the fixation bore 28 can be smaller in diameter, with respect to the diameter of the first section of the fixation bore 28, since it is conceived to receive the drill bit 60 therein.

In an embodiment, the two sections of the fixation bore 28 are concentric and are also concentric with the guiding channel 44 of the drilling guide 40. In an embodiment, the guiding channel 44 also has a diameter substantially identical to the diameter of the second section of the fixation bore 28, i.e. the guiding channel 44 and the second section of the fixation bore 28 are aligned and in register.

It is appreciated that other connecting assembly can be foreseen to temporarily attach the drilling guide 40 to the frame 22 than the thread-based connection shown and described. For instance and without being limitative, a clip-based connection could be used to temporarily attach the drilling guide 40 to the frame 22 in a single and predetermined orientation in association with a respective one of the fixation bore(s) and could be unclipped once the pilot hole has been performed into the jawbone.

Figure 5B:
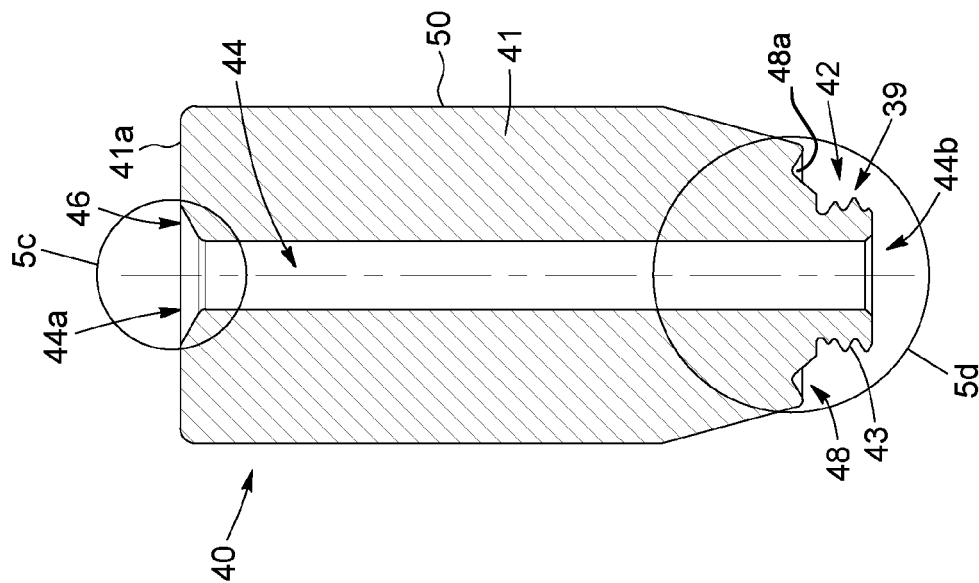
Figure 5A:
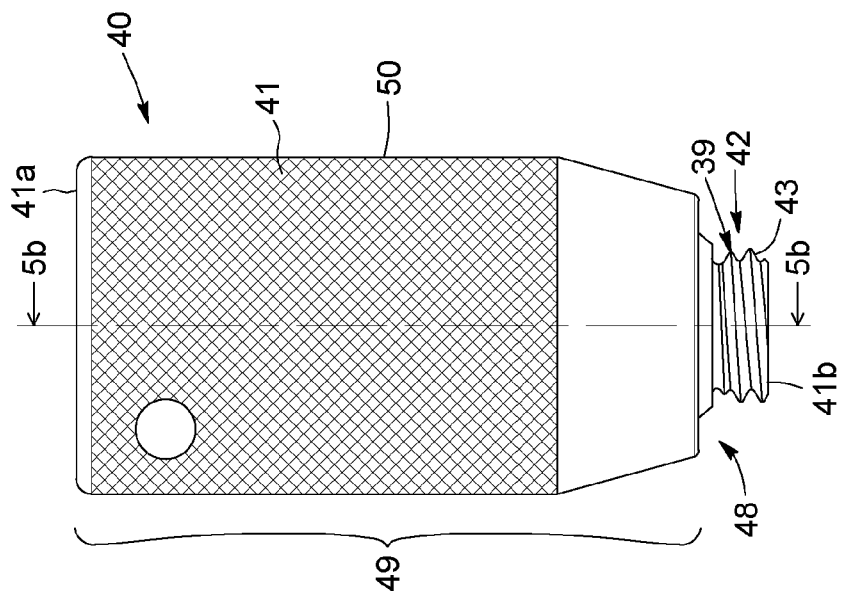
Figure 5D:
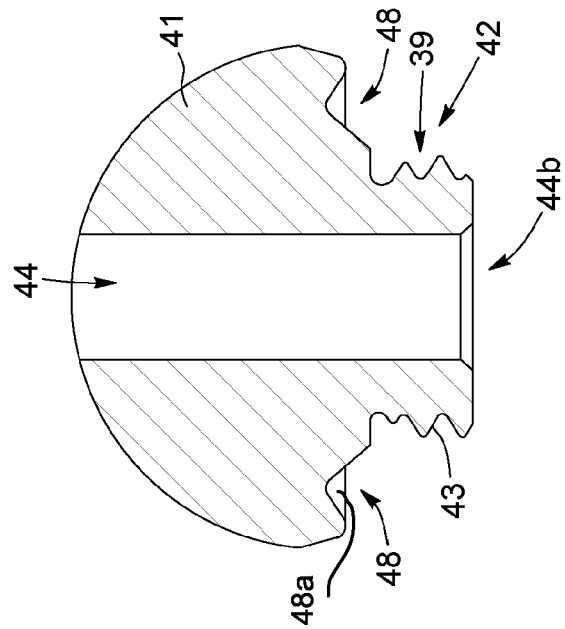
FIG. 5d is an enlarged cross-sectional view of a section of the drilling guide showing an outlet of the guiding channel of the drilling guide of FIG. 5a, identified as section 5d in FIG. 5b.
Figure 5C:
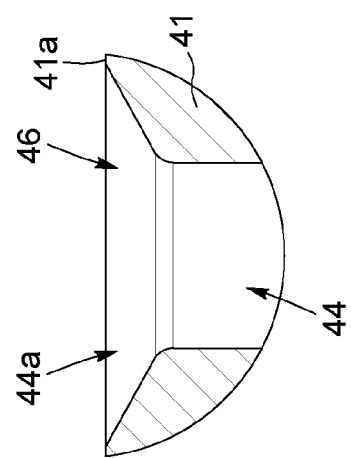
FIG. 5c is an enlarged cross-sectional view of a section of the drilling guide showing an inlet of an elongated guiding channel of the drilling guide of FIG. 5a, identified as section 5c in FIG. 5b.

In the embodiment shown, the diameter of the drilling guide body 41 is smaller along the threaded section 42 (or the subperiosteal engaging portion 39) than along a main section 49 of the drilling guide body 41 (i.e. the section of the drilling guide body 41 extending along the remaining portion thereof, outside of the threaded section 42), thereby defining a subperiosteal engagement shoulder 48, which is substantially annular in shape and extends outwardly and peripherally from an inner end of the threaded section 42 (or the subperiosteal engaging portion 39). The subperiosteal engagement shoulder 48 is therefore the section of the drilling guide body 41 defined between the threaded section 42 and an outer surface 50 of the main section 49 of the drilling guide body 41 and configured to abut against a corresponding section, i.e. a contact section, of the frame 22 of the subperiosteal dental implant device 20, when the drilling guide 40 is secured therewith. In an embodiment, the subperiosteal engagement shoulder 48 has a shoulder profile complementary in shape to a frame profile in the contact section of the frame 22 of the subperiosteal dental implant device 20, abutted thereon when the drilling guide 40 is secured to the subperiosteal dental implant device 20, and with a peripheral subperiosteal engagement groove 48a formed in the subperiosteal engagement shoulder 48 as shown in FIGS. 5b and 5d. In view of the above, it will be understood that, in an embodiment, the subperiosteal engagement shoulder 48 could present a shoulder profile different than the shoulder profile of the embodiment shown. In an embodiment, the subperiosteal engagement shoulder 48 could even have a substantially straight shoulder profile.

One skilled in the art will understand that, in an alternative embodiment (not shown), the diameter of the drilling guide body 41 could be substantially constant (i.e. the diameter of the drilling guide body 41 could be substantially the same along the threaded section 42 (or the subperiosteal engaging portion 39) as along the remaining portion thereof). Hence, in an embodiment (not shown), the drilling guide body 41 could include no subperiosteal engagement shoulder 48.

Figure 3A:
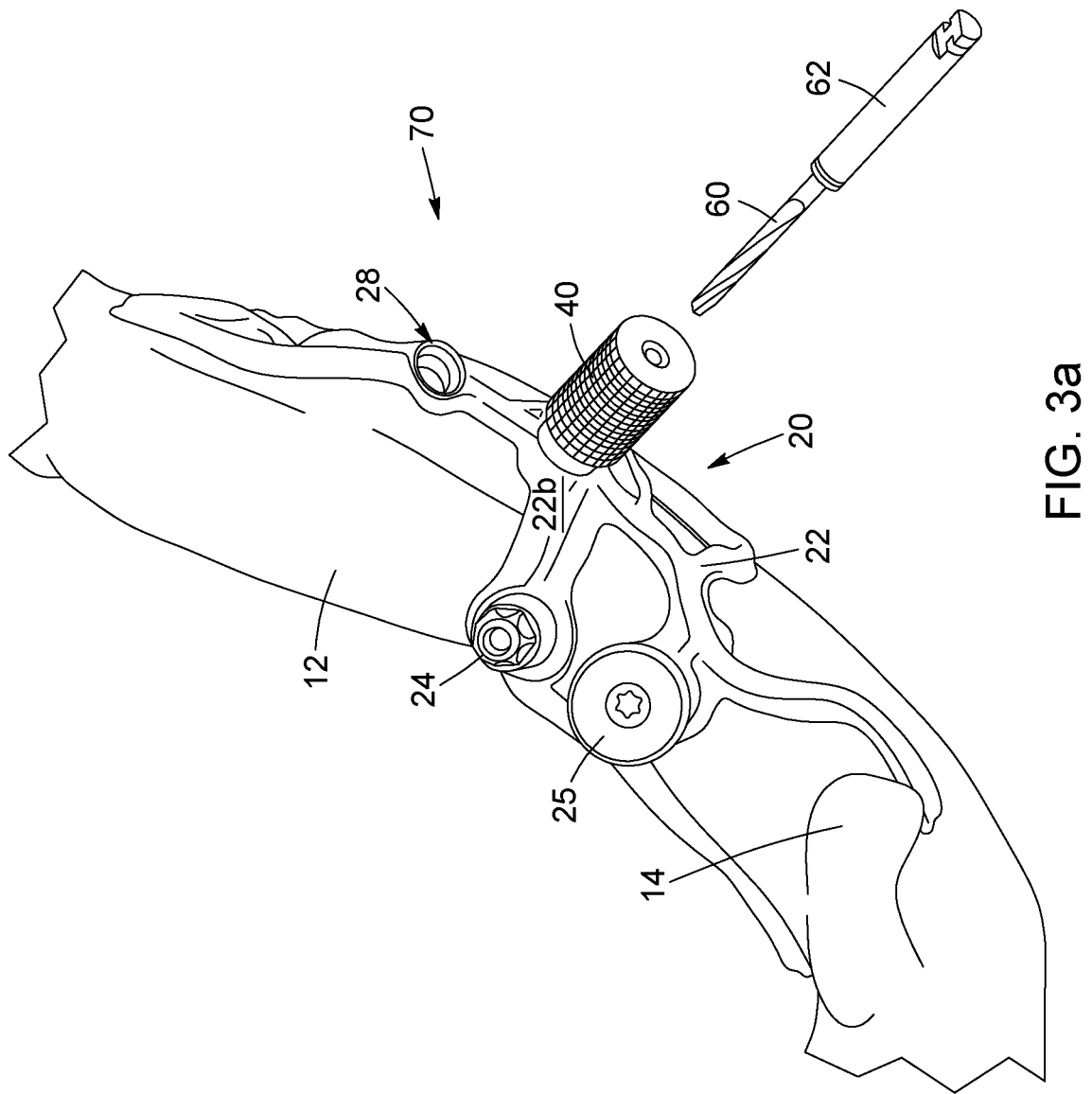
FIG. 3a is an isometric view of the partial subperiosteal dental implant device of FIG. 1, shown superposed to the jawbone of the patient, with a drilling guide engaged with the subperiosteal dental implant device.
Figure 3B:
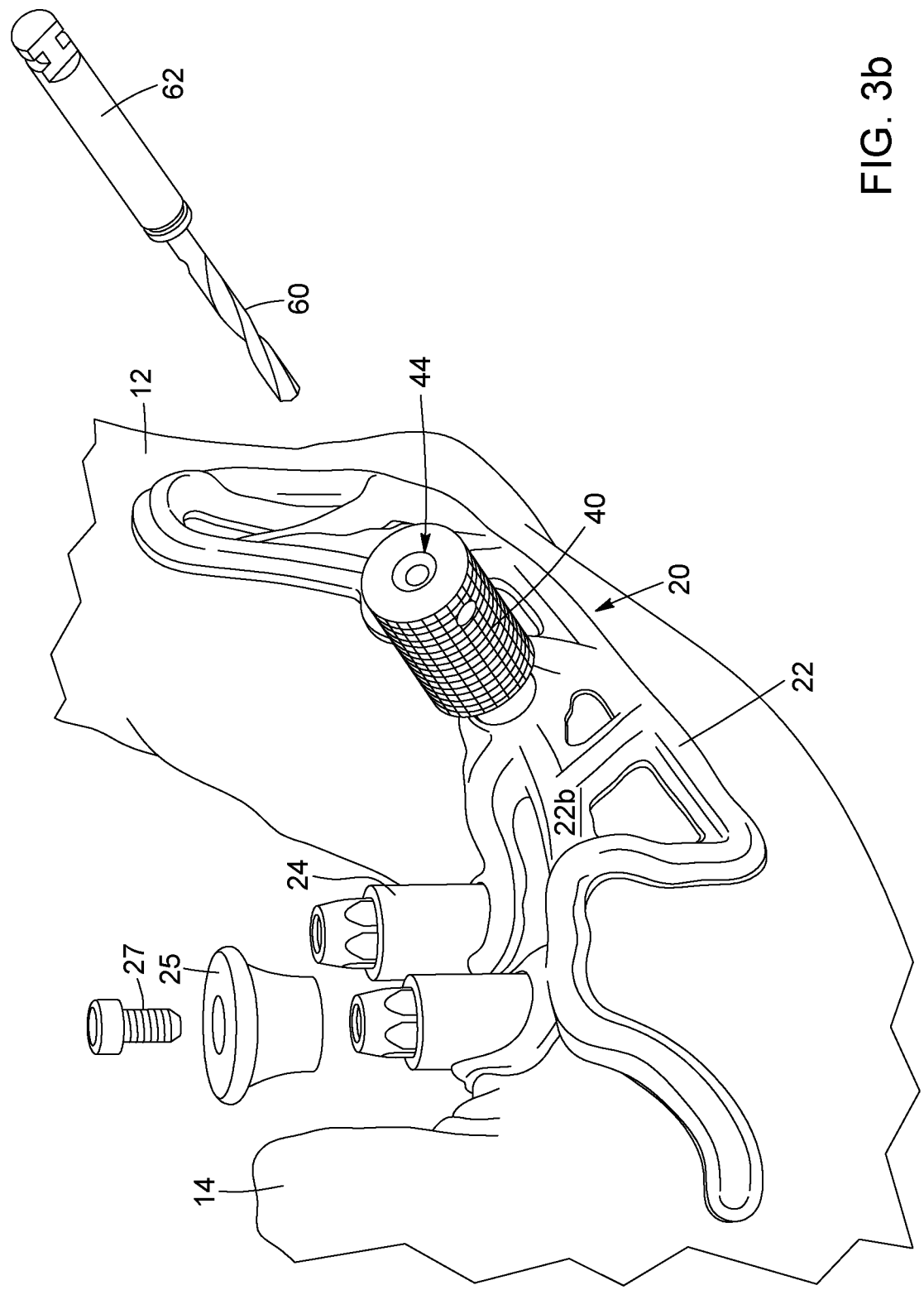
FIG. 3b is a close-up view of a section of the partial subperiosteal dental implant device of FIG. 3a, with the drilling guide engaged therewith.

Referring to FIGS. 3a and 3b, in an embodiment, a subperiosteal securement kit 70 including the above-described subperiosteal dental implant device 20 and drilling guide 40 can also be provided. In an embodiment, the subperiosteal securement kit 70 includes a subperiosteal dental implant device 20 securable to a jawbone 12 of a patient, and a single drilling guide 40 attachable to and detachable from (or temporary attachable to) the subperiosteal dental implant device 20. In an embodiment, the same drilling guide 40 can be attached to and detached from the frame 22 in periphery to each one of the fixation bore(s). For instance, and without being limitative, the same drilling guide 40 can be threaded in the internal threads 30 defined in the peripheral wall surface 31 of each fixation bore 28. In an alternative embodiment, the subperiosteal securement kit could include a subperiosteal dental implant device 20 securable to a jawbone 12 of a patient, and a plurality of drilling guides 40 attachable to and detachable from the subperiosteal dental implant device 20 in periphery to a corresponding one of the fixation bore(s). For instance, and without being limitative, each drilling guide 40 being adapted to be threaded in the internal threads 30 defined in the peripheral wall surface 31 of the corresponding fixation bore 28. The detailed characteristics of the subperiosteal dental implant device 20 and the drilling guide 40 which are included in the subperiosteal securement kit 70 have been described above and will not be repeated herein.

In an embodiment, the subperiosteal securement kit 70 further includes at least one bone screw 32 insertable into a fixation bore 28 of the subperiosteal dental implant device 20 and in a pre-hole (pilot hole) defined in the jawbone 12 and securable to the jawbone 12.

Such a subperiosteal securement kit 70 allows attachment of the drilling guide 40 to the subperiosteal dental implant device 20, to allow the performance of precise drilling of a pre-hole (pilot hole) in the jawbone 12 of a patient, for subsequent insertion of a bone screw 32 in a fixation bore 28 of the subperiosteal dental implant device 20 and a corresponding pre-hole (pilot hole) in the jawbone 12 of the patient, with the threads of the bone screw 32 engaging the jawbone 12.

The subperiosteal dental implant device 20 and corresponding drilling guide(s) 40, along with the kit including both components, having been described above, a method for securing the subperiosteal dental implant device 20 to an exposed jawbone 12, using the above described subperiosteal dental implant device 20 and corresponding drilling guide(s) 40, will now be described in more details below.

The method for securing the subperiosteal dental implant device 20 to an exposed jawbone 12 includes the step of attaching the drilling guide 40 to the subperiosteal dental implant device 20, such that a guiding channel 44 of the drilling guide 40 is aligned (or concentric) with a corresponding fixation bore 28 and in communication therewith to allow insertion of a drilling tool therein (i.e. in a single channel defined by the fixation bore 28 which extends as a continuation of the guiding channel 44). In an embodiment, the step of attaching the drilling guide 40 to the subperiosteal dental implant device 20 includes threading a threaded section 42 of the drilling guide 40 into internal threads 30 defined in a peripheral wall surface 31 delimiting a corresponding fixation bore 28.

The method also includes the step of superposing the subperiosteal dental implant device 20 to the jawbone and positioning the subperiosteal dental implant device 20 at the appropriate position with regard to the jawbone 12. For example, and without being limitative, in an embodiment, positioning the subperiosteal dental implant device 20 at the appropriate position with regard to the jawbone 12 can be performed using a positioning jig (not shown) engageable with the subperiosteal dental implant device 20 and at least one existing tooth 14. In alternative embodiments, other positioning techniques or method could also be used. One skilled in the art will understand that, in an embodiment, the step of attaching the drilling guide 40 to the subperiosteal dental implant device 20 can be performed once the subperiosteal dental implant device 20 is in place (i.e. the subperiosteal dental implant device 20 is superposed to and engaged with the jawbone 12).

The method further includes the step of inserting a drill bit 60 into the guiding channel of the drilling guide 40 and moving the drill bit 60 along the guiding channel 44 to drill a pre-hole (or pilot hole), at a position corresponding to a fixation bore 28 and along a predetermined orientation (angulation), in the jawbone 12 of the patient.

The method subsequently includes the step of detaching the drilling guide 40 from the subperiosteal dental implant device 20. In an embodiment, the step of detaching the drilling guide 40 from the subperiosteal dental implant device 20 includes unthreading the threaded section 42 of the drilling guide 40 from the internal threads 30 defined in the peripheral wall surface 31 delimiting the corresponding fixation bore 28.

The method also includes the step of inserting a bone screw 32 in the corresponding fixation bore 28 and the pre-hole (pilot hole) in the jawbone 12, to fasten the bone screw 32 to the jawbone 12 of the patient and consequently secure the subperiosteal dental implant device 20 to the jawbone 12 of the patient.

In an embodiment, the steps of attaching the drilling guide 40 to the subperiosteal dental implant device 20; drilling the pre-hole (pilot hole) in the jawbone 12, using the drilling guide 40; detaching the drilling guide 40 from the subperiosteal dental implant device 20; and inserting a bone screw 32 in the corresponding fixation bore 28 and the pre-hole (pilot hole) in the jawbone 12 to fasten the bone screw 32 to the jawbone 12 can be repeated for each fixation bore 28 of the frame 22 of the subperiosteal dental implant device 20. In an alternative embodiment, multiple drilling guides 40 can be initially attached to the subperiosteal dental implant device 20 (for instance and without being limitative, each drilling guide 40 being threaded into the internal threads 30 defined in the peripheral wall surface 31 delimiting a corresponding fixation bore 28). In such an embodiment, each drilling guide 40 can be used for drilling the pre-hole (pilot hole) in the jawbone 12 for the corresponding fixation bore 28 and can be subsequently detached from the subperiosteal dental implant device 20, for instance by unthreading the threaded section 42 of the drilling guide 40 from the internal threads 30 defined in the peripheral wall surface 31 delimiting the corresponding fixation bore 28.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A subperiosteal securement kit comprising:
   a subperiosteal dental implant device securable to a jawbone of a patient, the subperiosteal dental implant device comprising: a frame superposable to an external surface of the jawbone of the patient, the frame having a fixation bore extending through a section thereof and being sized and shaped to receive therein a bone screw; and
   a drilling guide directly attachable to the subperiosteal dental implant device, the drilling guide comprising a drilling guide body with an elongated guiding channel extending therethrough and being sized and shaped to receive a drill bit therein, the drilling guide being removably and directly attachable to the frame of the subperiosteal dental implant device, with the guiding channel being in communication with the fixation bore when the drilling guide is attached to the frame of the subperiosteal dental implant device;

wherein the drilling guide body comprises a main section with a drilling tool insertion end and a subperiosteal engaging portion comprising a subperiosteal engaging end and an opposed inner end, the subperiosteal engaging portion being at least partially insertable in the fixation bore and having an outer diameter smaller than an outer diameter of the main section, the drilling guide body including a subperiosteal engagement shoulder at a junction of the main section and the subperiosteal engaging portion configured to abut against a contact section of the frame when the drilling guide is secured therewith, a substantially annular peripheral subperiosteal engagement groove being formed in the subperiosteal engagement shoulder and surrounding the inner end of the subperiosteal engaging portion of the drilling guide body, a shoulder profile of the subperiosteal engagement shoulder being complementary in shape with a frame profile along the contact section.

2. The subperiosteal securement kit of claim 1, wherein the drilling guide further comprises a threaded section adjacent to the subperiosteal engaging end, and wherein the fixation bore is defined by a void section delimited by a peripheral wall surface facing inwardly towards the void section, the subperiosteal dental implant device further comprising internal threads defined along at least a portion of the peripheral wall surface delimiting the void section of the fixation bore, the peripheral wall surface and the corresponding internal threads being engageable with threads of the threaded section of the drilling guide.

3. The subperiosteal securement kit of claim 2, wherein the threaded section surrounds a section of the guiding channel extending at least partially along a length of the subperiosteal engaging portion of the drilling guide.

4. The subperiosteal securement kit of claim 2, wherein the threaded section of the drilling guide extends along an entire length of the subperiosteal engaging portion of the drilling guide body.

5. The subperiosteal securement kit of claim 1, wherein the guiding channel of the drilling guide is configured to receive the drill bit to drill a pilot hole in the jawbone of the patient, the subperiosteal securement kit further comprising a bone screw insertable in the fixation bore of the subperiosteal dental implant device and securable in the pilot hole defined in the jawbone of the patient.

6. The subperiosteal securement kit of claim 1, wherein the frame has a bone-facing surface and an implant head receiving surface, opposed to the bone-facing surface with the bone-facing surface being adapted to contact the external surface of the jawbone when the frame is superposed thereto and the fixation bore extending between the bone-facing surface and the implant head receiving surface.

7. The subperiosteal securement kit of claim 6, wherein the fixation bore is divided into first and second sections along a length thereof, the first section extending inwardly from the implant head receiving surface, a diameter of the fixation bore in the first section being wider than a diameter of the fixation bore in the second section extending inwardly from the bone-facing surface, the first and second sections being in communication and concentric with an abutting shoulder being defined at a junction thereof, the first section being designed to receive the subperiosteal engaging portion of the drilling guide body with the subperiosteal engaging end being abuttable against the abutting shoulder when the drilling guide is attached to the frame of the subperiosteal dental implant device.

8. The subperiosteal securement kit of claim 7, wherein the guiding channel has a diameter substantially identical to the diameter of the second section of the fixation bore, the first section of the fixation bore and the subperiosteal engaging portion being dimensioned so that the guiding channel and the second section of the fixation bore are aligned and in register when the drilling guide is secured with the subperiosteal dental implant device.

9. The subperiosteal securement kit of claim 7, wherein a peripheral wall surface delimiting the first section of the fixation bore includes internal threads along a portion thereof to engage with a threaded section formed on an outer surface of the subperiosteal engaging portion.

10. The subperiosteal securement kit of claim 6, wherein the drilling guide body comprises a threaded section directly engageable with a peripheral wall surface delimiting the fixation bore of the frame, the subperiosteal engagement shoulder being defined at a junction of an outer surface of the main section and the threaded section, configured to abut against the contact section of the frame, when the drilling guide is secured therewith.

11. The subperiosteal securement kit of claim 10, wherein the subperiosteal engagement shoulder is substantially annular in shape and extends outwardly and peripherally from an inner end of the threaded section.

12. The subperiosteal securement kit of claim 1, wherein the frame of the subperiosteal dental implant has a bone-facing surface and an implant head receiving surface, opposed to the bone-facing surface with the bone-facing surface being configured to contact the external surface of the jawbone when the frame is superposed thereto and the fixation bore extends between the bone-facing surface and the implant head receiving surface, the bone-facing surface being patient-specific and having a shape at least partially conforming to the external surface of the jawbone, with the frame being superposable to the jawbone in a single position.

13. The subperiosteal securement kit of claim 1, wherein the guiding channel of the drilling guide comprises an inlet port and a countersink, adjacent to the inlet port and surrounding the same.

\* \* \* \* \*